United States Patent
Foster et al.

(10) Patent No.: US 11,235,772 B2
(45) Date of Patent: Feb. 1, 2022

(54) SLIP CONTROL SYSTEM FOR AN OFF-ROAD VEHICLE

(71) Applicants: CNH Industrial America LLC, New Holland, PA (US); Autonomous Solutions, Inc., Mendon, UT (US)

(72) Inventors: Christopher A. Foster, Mohnton, PA (US); John H. Posselius, Ephrata, PA (US); Eric Emerson Veikle, Lititz, PA (US); Michael G. Hornberger, Weston, ID (US); Bret Todd Turpin, Wellsville, UT (US); Daniel John Morwood, Petersboro, UT (US)

(73) Assignees: CNH Industrial America LLC, New Holland, PA (US); Autonomous Solutions, Inc., Mendon, UT (US)

(*) Notice: Subject to any disclaimer, the term of this patent is extended or adjusted under 35 U.S.C. 154(b) by 262 days.

(21) Appl. No.: 16/045,129

(22) Filed: Jul. 25, 2018

(65) Prior Publication Data
US 2018/0326989 A1 Nov. 15, 2018

Related U.S. Application Data

(62) Division of application No. 15/287,059, filed on Oct. 6, 2016, now Pat. No. 10,053,100.
(Continued)

(51) Int. Cl.
*B60W 30/18* (2012.01)
*B60W 10/12* (2012.01)
(Continued)

(52) U.S. Cl.
CPC ..... *B60W 30/18172* (2013.01); *A01B 63/002* (2013.01); *A01B 63/02* (2013.01);
(Continued)

(58) Field of Classification Search
CPC ................. B60W 30/18172; A01B 63/002
See application file for complete search history.

(56) References Cited

U.S. PATENT DOCUMENTS

| | | | | |
|---|---|---|---|---|
| 3,622,977 A | * | 11/1971 | Wakamatsu | ............ B60T 8/885 340/453 |
| 5,159,991 A | | 11/1992 | Tsuyama et al. | |

(Continued)

FOREIGN PATENT DOCUMENTS

| | | |
|---|---|---|
| DE | 10219270 | 4/2003 |
| DE | 102008001879 | 11/2009 |

(Continued)

OTHER PUBLICATIONS

PCT Application No. PCT/US2017/025782 International Search Report and Written Opinion dated Jul. 3, 2017, 15 pages.
(Continued)

*Primary Examiner* — Jess Whittington
(74) *Attorney, Agent, or Firm* — Rebecca L. Henkel; Rickard K. DeMille

(57) ABSTRACT

A slip control system for an off-road vehicle includes a control system configured to output a signal indicative of a first action if a magnitude of slippage of the off-road vehicle relative to a soil surface is greater than a first threshold value and less than or equal to a second threshold value. Furthermore, the control system is configured to output a signal indicative of a second action, different than the first action, if the magnitude of slippage is greater than the second threshold value.

14 Claims, 6 Drawing Sheets

Related U.S. Application Data

(60) Provisional application No. 62/239,607, filed on Oct. 9, 2015.

(51) Int. Cl.

| | | |
|---|---|---|
| *B60W 10/119* | (2012.01) | |
| *B60W 50/14* | (2020.01) | |
| *A01B 63/11* | (2006.01) | |
| *B60W 10/30* | (2006.01) | |
| *B60W 30/188* | (2012.01) | |
| *B60W 40/064* | (2012.01) | |
| *A01B 63/00* | (2006.01) | |
| *A01B 63/02* | (2006.01) | |
| *A01B 63/112* | (2006.01) | |

(52) U.S. Cl.
CPC ............ *A01B 63/11* (2013.01); *A01B 63/112* (2013.01); *B60W 10/119* (2013.01); *B60W 10/12* (2013.01); *B60W 10/30* (2013.01); *B60W 30/1888* (2013.01); *B60W 40/064* (2013.01); *B60W 50/14* (2013.01); *B60W 2300/152* (2013.01); *B60W 2300/185* (2013.01); *B60W 2520/26* (2013.01); *B60W 2530/10* (2013.01); *B60W 2552/00* (2020.02); *B60W 2552/15* (2020.02); *B60W 2555/20* (2020.02); *B60W 2710/125* (2013.01)

(56) References Cited

U.S. PATENT DOCUMENTS

| | | | |
|---|---|---|---|
| 5,755,291 A * | 5/1998 | Orbach | A01B 63/112 |
| | | | 172/2 |
| 6,324,461 B1 * | 11/2001 | Yamaguchi | B60T 8/172 |
| | | | 180/197 |
| 6,533,367 B1 | 3/2003 | Latarnik et al. | |
| 6,577,942 B1 | 6/2003 | Moore | |
| 7,159,954 B2 | 1/2007 | Goebels et al. | |
| 8,073,609 B2 | 12/2011 | Koch | |
| 8,140,239 B2 | 3/2012 | Stratton et al. | |
| 8,180,547 B2 | 5/2012 | Prasad et al. | |
| 8,346,450 B2 | 1/2013 | Pohlenz et al. | |
| 8,600,621 B2 | 12/2013 | Callaway et al. | |
| 8,909,451 B2 | 12/2014 | Kinoshita et al. | |
| 9,573,595 B2 | 2/2017 | Fairgrieve et al. | |
| 2003/0058091 A1 * | 3/2003 | Petersen | B61H 13/02 |
| | | | 340/457.3 |
| 2006/0150724 A1 * | 7/2006 | Byrne | G01M 17/027 |
| | | | 73/146 |
| 2008/0257569 A1 | 10/2008 | Foster et al. | |
| 2009/0278839 A1 | 11/2009 | Geis et al. | |
| 2011/0160977 A1 * | 6/2011 | Matsuda | B60T 8/175 |
| | | | 701/85 |
| 2014/0049405 A1 * | 2/2014 | Breuer | G01N 21/35 |
| | | | 340/905 |
| 2014/0094989 A1 | 4/2014 | Dadu et al. | |
| 2016/0082972 A1 * | 3/2016 | Fairgrieve | B60W 10/184 |
| | | | 701/84 |
| 2016/0088787 A1 * | 3/2016 | Connell | A01B 76/00 |
| | | | 701/50 |
| 2017/0001646 A1 * | 1/2017 | Cooke | B60W 10/18 |
| 2017/0066324 A1 * | 3/2017 | Hertel | B60K 28/16 |
| 2017/0259828 A1 * | 9/2017 | Yamaoka | B60T 7/042 |
| 2018/0156329 A1 * | 6/2018 | Hose | B60W 10/11 |

FOREIGN PATENT DOCUMENTS

| | | |
|---|---|---|
| SU | 1418091 | 8/1988 |
| SU | 1602782 | 10/1990 |

OTHER PUBLICATIONS

Russian Application No. 2019111879, Notice to Grant, dated Jan. 21, 2020, 16 pgs.

Yahya et al., "Mapping System for Tractor-Implement Performance," Computers and Electronics in Agriculture, Nov. 2009, pp. 2-11, vol. 69, issue 1, Elsevier.

* cited by examiner

SLIP CONTROL SYSTEM FOR AN OFF-ROAD VEHICLE

CROSS REFERENCE TO RELATED APPLICATIONS

This application is a divisional of U.S. patent application Ser. No. 15/287,059, entitled "SLIP CONTROL SYSTEM FOR AN OFF-ROAD VEHICLE", filed Oct. 6, 2016, which claims priority from and the benefit of U.S. Provisional Application No. 62/239,607, entitled "SLIP CONTROL SYSTEM FOR AN OFF-ROAD VEHICLE", filed Oct. 9, 2015. Each of the foregoing applications is hereby incorporated by reference in its entirety.

BACKGROUND

The invention relates generally to a slip control system for an off-road vehicle.

Off-road vehicles, such as agricultural tractors may be operated in a variety of soil conditions. For example, a tractor may be driven through a field having soft soil (e.g., due to a high moisture content of the soil). In certain soft soil conditions, wheels and/or tracks of the tractor may slip relative to the soil surface. That is, the ground engaging surface of the wheel or track may move at a higher speed than the ground speed of the tractor. While the tractor may successfully traverse a field while experiencing a low or medium degree of slippage, a high degree of slippage may cause the soil under the wheels or tracks of the tractor to become compacted and/or rutted. As a result, the yield from crops located within the compacted and/or rutted soil may be reduced. In addition, a high degree of slippage may cause the tractor to become stuck in the soil (e.g., as the wheels and/or tracks dig into the soil surface). Unfortunately, the process of extracting a stuck tractor may be significantly time-consuming, thereby reducing the efficiency of field operations (e.g., tillage operations, planting operations, harvesting operations, etc.).

BRIEF DESCRIPTION

In one embodiment, a slip control system for an off-road vehicle includes a control system configured to receive a first signal indicative of a magnitude of slippage of the off-road vehicle relative to a soil surface and/or a second signal indicative of a rate of change of slippage of the off-road vehicle relative to the soil surface. The control system is also configured to output a third signal indicative of a first action if the magnitude of slippage is greater than a first threshold value and less than or equal to a second threshold value and/or the rate of change of slippage is greater than a third threshold value and less than or equal to a fourth threshold value, and not if the magnitude of slippage is greater than the second threshold value and/or the rate of change of slippage is greater than the fourth threshold value, in which the second threshold value is greater than the first threshold value, and the fourth threshold value is greater than the third threshold value. Furthermore, the control system is configured to output a fourth signal indicative of a second action, different than the first action, if the magnitude of slippage is greater than the second threshold value and/or the rate of change of slippage is greater than the fourth threshold value.

In another embodiment, a slip control system for an off-road vehicle includes a control system configured to receive a first signal indicative of a magnitude of slippage of the off-road vehicle relative to a soil surface. The control system is also configured to output a second signal indicative of a first action if the magnitude of slippage is greater than a first threshold value and less than or equal to a second threshold value for more than a first threshold duration, in which the second threshold value is greater than the first threshold value. In addition, the control system is configured to output a third signal indicative of a second action, different than the first action, if the magnitude of slippage is greater than the second threshold value.

In a further embodiment, a slip control system for an off-road vehicle includes a control system configured to receive a first signal indicative of a determined magnitude of slippage of the off-road vehicle relative to a soil surface. The control system is also configured to output a second signal indicative of a first action if the determined magnitude of slippage and/or an expected magnitude of slippage of the off-road vehicle relative to the soil surface is greater than a first threshold value and less than or equal to a second threshold value, and not if the determined magnitude of slippage and/or the expected magnitude of slippage is greater than the second threshold value, in which the second threshold value is greater than the first threshold value. In addition, the control system is configured to output a third signal indicative of a second action, different than the first action, if the determined magnitude of slippage and/or the expected magnitude of slippage is greater than the second threshold value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
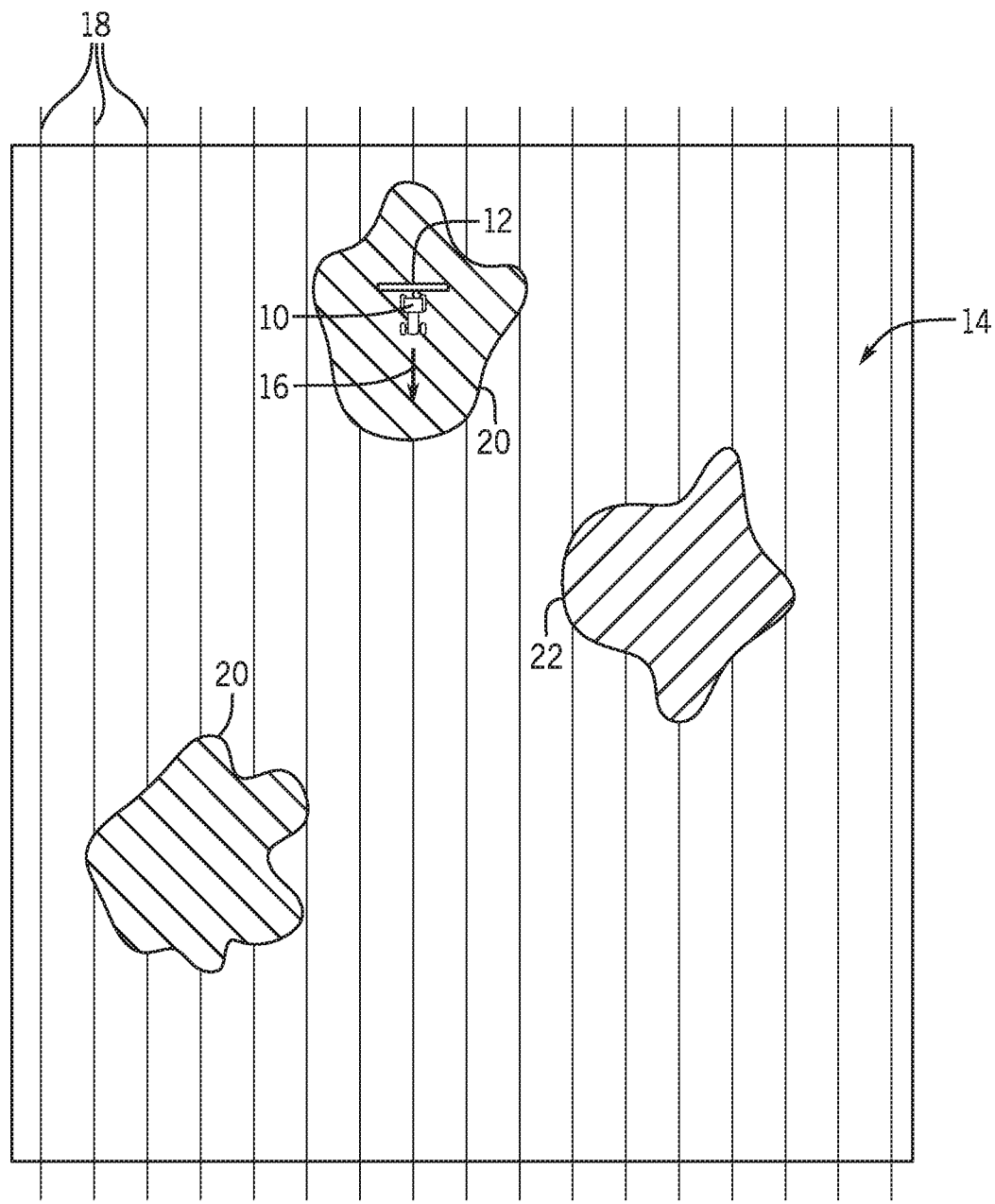
FIG. 1 is a schematic diagram of an embodiment of an off-road vehicle and an agricultural implement within an agricultural field.

FIG. 1 is a schematic diagram of an embodiment of an off-road vehicle 10 and an agricultural implement 12 within an agricultural field 14. The off-road vehicle 10 (e.g., tractor or other prime mover) is configured to tow the agricultural implement 12 throughout the field 14 along a direction of travel 16. In certain embodiments, the off-road vehicle 10 is directed (e.g., via an operator or an automated system) to traverse the field along substantially parallel rows 18. However, it should be appreciated that the off-road vehicle may be directed to traverse the field along other routes (e.g., along a spiral path, etc.) in alternative embodiments. As will be appreciated, the agricultural implement 12 may be any suitable implement for performing agricultural operations throughout the field 14. For example, in certain embodiments, the agricultural implement 12 may be a tillage tool, a fertilizer application tool, a seeding or planting tool, or a harvesting tool, among others. While the agricultural implement 12 is towed by the off-road vehicle 10 in the illustrated embodiment, it should be appreciated that in alternative embodiments, the agricultural implement may be integrated within the off-road vehicle.

As the off-road vehicle 10 and the agricultural implement 12 traverse the field, the off-road vehicle 10 and the agricultural implement 12 may encounter various soil conditions. For example, the off-road vehicle 10 and the agricultural implement 12 may encounter regions 20 in which the off-road vehicle (e.g., at least one wheel or track of the off-road vehicle) experiences a medium degree of slippage (e.g., 15 percent to 30 percent slippage). In addition, the off-road vehicle 10 and the agricultural implement 12 may encounter regions 22 in which the off-road vehicle (e.g., at least one wheel or track of the off-road vehicle) experiences a high degree of slippage (e.g., greater than 30 percent slippage). The degree of slippage may be dependent on the soil type, the soil moisture content, the slope/grade of the field 14, the weight of the off-road vehicle 10, the draft load applied by the agricultural implement 12 to the off-road vehicle 10, and the type and/or amount of crop residue on the surface of the field 14, among other factors. While the off-road vehicle 10 and the implement 12 may successfully traverse the field while experiencing a low degree of slippage (e.g., less than 15 percent slippage) or a medium degree of slippage, a high degree of slippage may cause the off-road vehicle 10 to become stuck in the soil (e.g., as the wheels and/or tracks of the off-road vehicle dig into the soil surface). Accordingly, in certain embodiments, the off-road vehicle 10 includes a slip control system configured to substantially reduce or eliminate the possibility of the off-road vehicle becoming stuck in the soil. As a result, the efficiency of agricultural operations (e.g., tillage operations, planting operations, harvesting operations, etc.) may be substantially enhanced.

In certain embodiments, the slip control system includes a control system configured to receive a first signal indicative of a magnitude of slippage of the off-road vehicle relative to a soil surface and/or a second signal indicative of a rate of change of slippage of the off-road vehicle relative to the soil surface. The control system is also configured to output a third signal indicative of a first action (e.g., alerting an operator, engaging a four wheel drive system, engaging a differential locking system, etc.) if the magnitude of slippage is greater than a first threshold value and less than or equal to a second threshold value and/or the rate of change of slippage is greater than a third threshold value and less than or equal to a fourth threshold value, and not if the magnitude of slippage is greater than the second threshold value and/or the rate of change of slippage is greater than the fourth threshold value. In addition, the control system is configured to output a fourth signal indicative of a second action, different than the first action, (e.g., reducing a penetration depth of at least one ground engaging tool, stopping the off-road vehicle, etc.) if the magnitude of slippage is greater than the second threshold value and/or the rate of change of slippage is grater than the fourth threshold value.

In further embodiments, the slip control system includes a control system configured to receive a first signal indicative of a magnitude of slippage of the off-road vehicle relative to the soil surface. The control system is also configured to output a second signal indicative of a first action (e.g., alerting an operator, engaging a four wheel drive system, engaging a differential locking system, etc.) if the magnitude of slippage is greater than a first threshold value and less than a second threshold value for more than a threshold duration. In addition, the control system is configured to output a third signal indicative of a second action, different than the first action, (e.g., reducing a penetration depth of at least one ground engaging tool, stopping the off-road vehicle, etc.) if the magnitude of slippage is greater than the second threshold value.

Furthermore, in certain embodiments, the slip control system includes a control system configured to receive a first signal indicative of a determined magnitude of slippage of the off-road vehicle relative to the soil surface. The control system is also configured to output a second signal indicative of a first action if the determined magnitude of slippage and/or an expected magnitude of slippage of the off-road vehicle relative to the soil surface is greater than a first threshold value and less than or equal to a second threshold value, and not if the determined magnitude of slippage and/or the expected magnitude of slippage is greater than the second threshold value. For example, the first action may include alerting an operator that the determined magnitude of slippage and/or the expected magnitude of slippage is greater than the first threshold value, engaging a four wheel drive system, engaging a differential locking system, or a combination thereof. In addition, the control system is configured to output a third signal indicative of a second action, different than the first action, (e.g., reducing a penetration depth of at least one ground engaging tool, stopping the off-road vehicle, etc.) if the determined magnitude of slippage and/or the expected magnitude of slippage is greater than the second threshold value.

As discussed above, in certain soft soil conditions, at least one wheel and/or track of the off-road vehicle may slip relative to the soil surface. Slippage occurs when a ground engaging surface of the wheel or track moves at a higher speed than the ground speed of the off-road vehicle. As disclosed herein, "magnitude of slippage" refers to a percentage difference between the speed of the ground engaging surface of the wheel or track and the ground speed of the off-road vehicle. For example, if the speed of the ground engaging surface of the wheel or track is equal to the ground speed of the off-road vehicle, the magnitude of slippage is 0 percent (i.e., no slippage). Conversely, if the speed of the ground engaging surface of the wheel or track is greater than zero (e.g., kilometers per hour), and the ground speed of the off-road vehicle is zero (e.g., kilometers per hour), the magnitude of slippage is 100 percent (i.e., complete slippage). By way of example only, a magnitude of slippage less than 15 percent may represent a low degree of slippage, a magnitude of slippage between 15 percent and 30 percent may represent a medium degree of slippage, and a magnitude of slippage greater than 30 percent may represent a high degree of slippage. However, it should be appreciated that the slippage ranges may vary based on soil condition and/or operating conditions of the off-road vehicle.

In certain soil conditions, the magnitude of slippage may be less than zero (i.e., negative). That is, the ground speed of the off-road vehicle may be greater than the speed of the ground engaging surface of the wheel or track. While the magnitude of slippage is negative, the off-road vehicle slides relative to the surface of the field, thereby reducing control of the off-road vehicle. As discussed in detail below, the slip control system may be configured to substantially reduce sliding, thereby enhancing control of the off-road vehicle.

Furthermore, as used herein, "rate of change of slippage" refers to a change in the magnitude of slippage as a function of time. By way of example, a high rate of change of slippage (e.g., greater than 5 percent per minute) may be indicative of soil conditions in which a high degree of slippage is likely to occur. Accordingly, as discussed in detail below, the slip control system may be configured to alert an operator and/or to control the off-road vehicle and/or agricultural implement if a high rate of change of slippage is detected.

In certain embodiments, the off-road vehicle is configured to operate autonomously (e.g., without an operator present in the cab of the off-road vehicle). Accordingly, an automatic system may direct the off-road vehicle and agricultural implement throughout the field without direct control by an operator. In such embodiments, the autonomous off-road vehicle is configured to communicate with a base station. As discussed in detail below, the control system of the slip control system may include a controller of the off-road vehicle, a controller of the base station, or a combination thereof. In further embodiments, the off-road vehicle may be substantially manually controlled. That is, an operator may be located within the cab of the off-road vehicle, and the operator may manually steer the off-road vehicle throughout the field. In such embodiments, the slip control system may alert the operator of certain slippage conditions and/or automatically control the off-road vehicle and/or the agricultural implement to reduce the slippage. Furthermore, in certain embodiments, the off-road vehicle may be configured to operate semi-autonomously. For example, an operator within the cab may direct the off-road vehicle to a starting position within or proximate to the field, and an automated system may direct the off-road vehicle along a selected/planned route through the field while the operator monitors operation of the off-road vehicle and/or the implement. In such embodiments, the slip control system may alert the operator of certain slippage conditions and/or automatically control the off-road vehicle and/or the agricultural implement to reduce the slippage.

Figure 2:
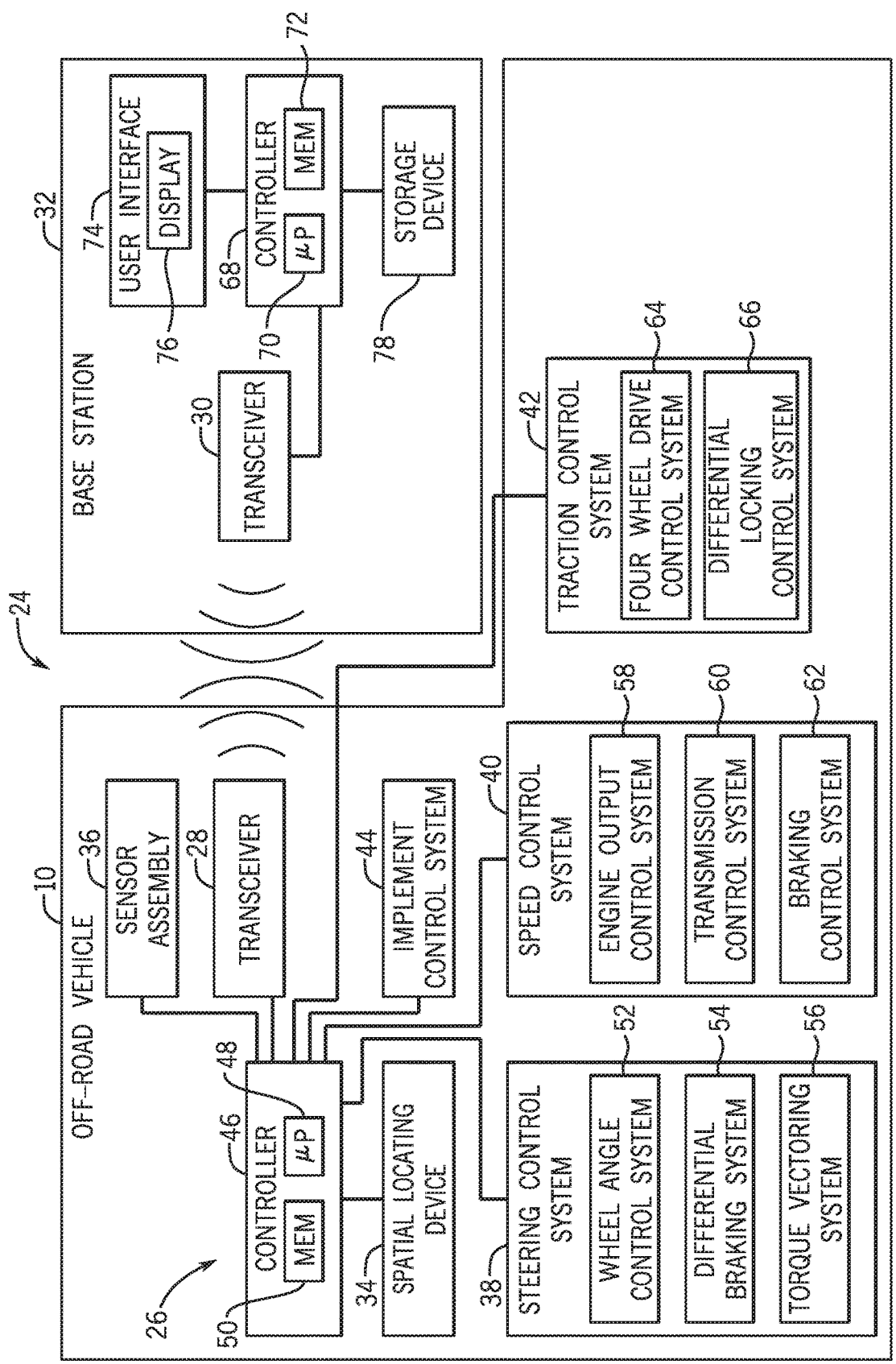
FIG. 2 is a schematic diagram of an embodiment of a slip control system that may be utilized to control the off-road vehicle and the agricultural implement of FIG. 1.

FIG. 2 is a schematic diagram of an embodiment of a slip control system 24 that may be utilized to control the off-road vehicle 10 and the agricultural implement of FIG. 1. In the illustrated embodiment, the slip control system 24 includes a control system 26 (e.g., mounted on the off-road vehicle 10), and the off-road vehicle 10 includes a first transceiver 28 configured to establish a wireless communication link with a second transceiver 30 of a base station 32. As will be appreciated, the first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

In the illustrated embodiment, the off-road vehicle 10 includes a spatial locating device 34, which is mounted to the off-road vehicle 10 and configured to determine a position of the off-road vehicle 10. As will be appreciated, the spatial locating device may include any suitable system configured to determine the position of the off-road vehicle, such as a global positioning system (GPS), for example. In certain embodiments, the spatial locating device 34 may be configured to determine the position of the off-road vehicle relative to a fixed point within the field (e.g., via a fixed radio transceiver). Accordingly, the spatial locating device 34 may be configured to determine the position of the off-road vehicle relative to a fixed global coordinate system (e.g., via the GPS) or a fixed local coordinate system. In certain embodiments, the first transceiver 28 is configured to broadcast a signal indicative of the position of the off-road vehicle 10 to the transceiver 30 of the base station 32.

In addition, the off-road vehicle 10 includes a sensor assembly 36. In certain embodiments, the sensor assembly is configured to facilitate determination of the magnitude of slippage and/or the rate of change of slippage of the off-road vehicle. For example, the sensor assembly 36 may include multiple sensors (e.g., infrared sensors, ultrasonic sensors, magnetic sensors, etc.), each configured to monitor a rotation rate of a respective wheel or track. As discussed in detail below, a speed of the ground engaging surface of the wheel or track may be determined based at least in part on the determined rotation rate, and the magnitude of slippage and the rate of change of slippage may be determined by comparing the speed of the ground engaging surface of the wheel or track to the ground speed of the off-road vehicle 10.

In the illustrated embodiment, the off-road vehicle 10 includes a steering control system 38 configured to control a direction of movement of the off-road vehicle 10, and a speed control system 40 configured to control a speed of the off-road vehicle 10. In addition, the off-road vehicle 10 includes a traction control system 42 configured to control distribution of power from an engine of the off-road vehicle to wheels or tracks of the off-road vehicle, and an implement control system 44 configured to control operation of an implement (e.g., towed by the off-road vehicle 10). Furthermore, the control system 26 includes a controller 46 communicatively coupled to the first transceiver 28, to the spatial locating device 34, to the sensor assembly 36, to the steering control system 38, to the speed control system 40, to the traction control system 42, and to the implement control system 44. In certain embodiments, the controller 46 is configured to receive a first signal indicative of a magnitude of slippage of the off-road vehicle 10 relative to a soil surface (e.g., from the sensor assembly 36) and to receive a second signal indicative of a rate of change of slippage of the off-road vehicle relative to the soil surface (e.g., from the sensor assembly 36). In such embodiments, the controller 46 is configured to output a third signal indicative of a first action (e.g., alerting an operator, engaging a four wheel drive system and/or a differential locking system via the traction control system 42, etc.) if the magnitude of slippage is greater than a first threshold value and less than or equal to a second threshold value and/or the rate of change of slippage is greater than a third threshold value and less than or equal to a fourth threshold value, and not if the magnitude of slippage is greater than the second threshold value and/or the rate of change of slippage is greater than the fourth threshold value. The controller 46 is also configured to output a fourth signal indicative of a second action, different than the first action, (e.g., reducing a penetration depth of at least one ground engaging tool via the implement control system 44, stopping the off-road vehicle via the speed control system 40, etc.) if the magnitude of slippage is greater than the second threshold value and/or the rate of change of slippage is greater than the fourth threshold value.

In further embodiments, the controller 46 is configured to receive a first signal indicative of a magnitude of slippage of the off-road vehicle relative to the soil surface (e.g., from the sensor assembly 36). In such embodiments, the controller 46 is configured to output a second signal indicative of a first action (e.g., alerting an operator, engaging a four wheel drive system and/or a differential locking system via the traction control system 42, etc.) if the magnitude of slippage is greater than a first threshold value and less than or equal to a second threshold value for more than a threshold duration. The controller 46 is also configured to output a third signal indicative of a second action, different than the first action, (e.g., reducing a penetration depth of at least one ground engaging tool via the implement control system 44, stopping the off-road vehicle via the speed control system 40, etc.) if the magnitude of slippage is greater than the second threshold value.

Furthermore, in certain embodiments, the controller 46 is configured to receive a first signal indicative of a determined magnitude of slippage of the off-road vehicle relative to the soil surface (e.g., via the sensor assembly 36). In such embodiments, the controller 46 is configured to output a second signal indicative of a first action (e.g., alerting an operator, engaging a four wheel drive system and/or a differential locking system via the traction control system 42, etc.) if the determined magnitude of slippage and/or an expected magnitude of slippage of the off-road vehicle relative to the soil surface is greater than a first threshold value and less than or equal to a second threshold value, and not if the determined magnitude of slippage and/or the expected magnitude of slippage is greater than the second threshold value. The controller 46 is also configured to output a third signal indicative of a second action, different than the first action, (e.g., reducing a penetration depth of at least one ground engaging tool via the implement control system 44, stopping the off-road vehicle via the speed control system 40, etc.) if the determined magnitude of slippage and/or the expected magnitude of slippage is greater than the second threshold value.

In certain embodiments, the controller 46 is an electronic controller having electrical circuitry configured to process data from the transceiver 28, the spatial locating device 34, the sensor assembly 36, or a combination thereof, among other components of the off-road vehicle 10. In the illustrated embodiment, the controller 46 includes a processor, such as the illustrated microprocessor 48, and a memory device 50. The controller 46 may also include one or more storage devices and/or other suitable components. The processor 48 may be used to execute software, such as software for controlling the off-road vehicle 10, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 48 may include one or more reduced instruction set (RISC) processors.

The memory device 50 may include a volatile memory, such as random access memory (RAM), and/or a nonvolatile memory, such as ROM. The memory device 50 may store a variety of information and may be used for various purposes. For example, the memory device 50 may store processor-executable instructions (e.g., firmware or software) for the processor 48 to execute, such as instructions for controlling the off-road vehicle 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., expected slippage magnitudes, soil maps, etc.), instructions (e.g., software or firmware for controlling the off-road vehicle, etc.), and any other suitable data.

In the illustrated embodiment, the steering control system 38 includes a wheel angle control system 52, a differential braking system 54, and a torque vectoring system 56. The wheel angle control system 52 may automatically rotate one or more wheels or tracks of the off-road vehicle (e.g., via hydraulic actuators) to steer the off-road vehicle along a path through the field (e.g., around a region having a high expected magnitude of slippage). By way of example, the wheel angle control system 52 may rotate front wheels/tracks, rear wheels/tracks, and/or intermediate wheels/tracks of the off-road vehicle, either individually or in groups. The differential braking system 54 may independently vary the braking force on each lateral side of the off-road vehicle to direct the off-road vehicle along the path through the field. Similarly, the torque vectoring system 56 may differentially apply torque from the engine to wheels and/or tracks on each lateral side of the off-road vehicle, thereby directing the off-road vehicle along the path through the field. While the illustrated steering control system 38 includes the wheel angle control system 52, the differential braking system 54, and the torque vectoring system 56, it should be appreciated that alternative embodiments may include one or two of these systems, in any suitable combination. Further embodiments may include a steering control system 38 having other and/or additional systems to facilitate directing the off-road vehicle along the path through the field (e.g., an articulated steering system, etc.).

In the illustrated embodiment, the speed control system 40 includes an engine output control system 58, a transmission control system 60, and a braking control system 62. The engine output control system 58 is configured to vary the output of the engine to control the speed of the off-road vehicle. For example, the engine output control system 58 may vary a throttle setting of the engine, a fuel/air mixture of the engine, a timing of the engine, and/or other suitable engine parameters to control engine output. In addition, the transmission control system 60 may adjust gear selection within a transmission to control the speed of the off-road vehicle. Furthermore, the braking control system 62 may adjust braking force, thereby controlling the speed of the off-road vehicle 10. While the illustrated speed control system 40 includes the engine output control system 58, the transmission control system 60, and the braking control system 62, it should be appreciated that alternative embodiments may include one or two of these systems, in any suitable combination. Further embodiments may include a speed control system 40 having other and/or additional systems to facilitate adjusting the speed of the off-road vehicle.

In the illustrated embodiment, the traction control system 42 includes a four wheel drive control system 64 and a differential locking control system 66. The four wheel drive control system 64 is configured to selectively engage and disengage a four wheel drive system of the off-road vehicle. For example, in certain embodiments, the off-road vehicle may include a four wheel drive system configured to direct engine output to the rear wheels/tracks while disengaged, and to direct engine output to the front wheels/tracks and the rear wheels/tracks while engaged. In such embodiments, the four wheel drive control system 64 may selectively instruct the four wheel drive system to engage and disengage to control traction of the off-road vehicle. In certain embodiments, the off-road vehicle may include intermediate wheels/tracks positioned between the front wheels/tracks and the rear wheels/tracks. In such embodiments, the four wheel drive control system may also control the transfer of engine power to the intermediate wheels.

In addition, the differential locking control system 66 is configured to selectively engage a differential locking system of at least one locking differential between a respective pair of wheels/tracks. For example, in certain embodiments, a locking differential is positioned between the rear wheels/tracks and configured to transfer engine power to the rear wheels/tracks. While the differential locking system is disengaged, the differential is unlocked. As a result, the rotational speed of one rear wheel/track may vary relative to the rotational speed of the other rear wheel/track. However, when the differential locking system is engaged, the differential is locked. As a result, the rotational speeds of the rear wheels/tracks may be substantially equal to one another. In certain embodiments, a locking differential may be positioned between the front wheels/tracks and/or between intermediate wheels/tracks. In certain embodiments, the differential locking control system 66 is configured to independently engage and disengage the differential locking system of each locking differential. While the illustrated traction control system 42 includes the four wheel drive control system 64 and the differential locking control system 66, it should be appreciated that alternative embodiments may include only one of these systems. Further embodiments may include a traction control system 42 having other and/or additional systems to facilitate control of traction of the off-road vehicle 10.

The implement control system 44 is configured to control various parameters of the agricultural implement towed by the off-road vehicle. For example, in certain embodiments, the implement control system 44 may be configured to instruct an implement controller (e.g., via a communication link, such as a CAN bus or ISOBUS) to adjust a penetration depth of at least one ground engaging tool of the agricultural implement. By way of example, the implement control system 44 may instruct the implement controller to reduce the penetration depth of each tillage point on a tilling implement, or the implement control system 44 may instruct the implement controller to disengage each opener disc/blade of a seeding/planting implement from the soil. Reducing the penetration depth of at least one ground engaging tool of the agricultural implement may reduce the draft load on the off-road vehicle. Furthermore, the implement control system 44 may instruct the implement controller to transition the agricultural implement between a working position and a transport portion, to adjust a flow rate of product from the agricultural implement, or to adjust a position of a header of the agricultural implement (e.g., a harvester, etc.), among other operations.

In certain embodiments, the off-road vehicle controller 46 may directly control the penetration depth of at least one ground engaging tool of the agricultural implement. For example, the off-road vehicle controller 46 may instruct a three-point hitch (e.g., via a three-point hitch controller) to raise and lower the agricultural implement or a portion of the agricultural implement relative to the soil surface, thereby adjusting the penetration depth of the at least one ground engaging tool of the agricultural implement. In addition, the off-road vehicle controller 46 may instruct a hydraulic control system to adjust hydraulic fluid pressure to one or more actuators on the agricultural implement, thereby controlling the penetration depth of respective ground engaging tool(s).

As previously discussed, the off-road vehicle 10 is configured to communicate with the base station 32 via the transceivers 28 and 30. In the illustrated embodiment, the base station includes a controller 68 communicatively coupled to the base station transceiver 30. The controller 68 is configured to output commands and/or data to the off-road vehicle 10. For example, as discussed in detail below, the controller 68 may be configured to output a slippage map (e.g., including weather data, soil moisture data, topographical data, etc.) to the off-road vehicle controller 46, thereby enabling the off-road vehicle controller to determine an expected slippage of the off-road vehicle. In addition, the controller 68 may output start and stop commands to the off-road vehicle controller, and/or the controller 68 may instruct the off-road vehicle to follow a selected/planned path through the field.

In certain embodiments, the controller 68 is an electronic controller having electrical circuitry configured to process data from certain components of the base station 32 (e.g., the transceiver 30). In the illustrated embodiment, the controller 68 includes a processor, such as the illustrated microprocessor 70, and a memory device 72. The processor 68 may be used to execute software, such as software for providing commands and/or data to the off-road vehicle controller 46, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors. The memory device 72 may include a volatile memory, such as random access memory (RAM), and/or a nonvolatile memory, such as ROM. The memory device 72 may store a variety of information and may be used for various purposes. For example, the memory device 72 may store processor-executable instructions (e.g., firmware or software) for the processor 70 to execute, such as instructions for providing commands and/or data to the off-road vehicle controller 46.

In the illustrated embodiment, the base station 32 includes a user interface 74 communicatively coupled to the controller 68. The user interface 74 is configured to present data from the off-road vehicle and/or the agricultural implement to an operator (e.g., data associated with operation of the off-road vehicle, data associated with operation of the agricultural implement, etc.). The user interface 74 is also configured to enable an operator to control certain functions of the off-road vehicle (e.g., starting and stopping the off-road vehicle, instructing the off-road vehicle to follow a selected/planned route through the field, etc.). In the illustrated embodiment, the user interface includes a display 76 configured to present information to the operator, such as the position of the off-road vehicle 10 within the field, the speed of the off-road vehicle, and the path of the off-road vehicle, among other data. In addition, the user interface 74 (e.g., via the display 76, via an audio system, etc.) is configured to alert an operator if slippage is detected and/or expected. For example, in certain embodiments, the user interface 74 may alert the operator if the off-road vehicle is experiencing a medium degree of slippage (e.g., if the magnitude of slippage is within a threshold range).

In the illustrated embodiment, the base station 32 includes a storage device 78 communicatively coupled to the controller 68. The storage device 78 (e.g., nonvolatile storage) may include read-only memory (ROM), flash memory, a hard drive, or any other suitable optical, magnetic, or solid-state storage medium, or a combination thereof. The storage device(s) may store data (e.g., expected slippage magnitudes, soil maps, etc.), instructions (e.g., software or firmware for commanding the off-road vehicle, etc.), and any other suitable data.

While the control system 26 of the slip control system 24 includes the off-road vehicle controller 46 in the illustrated embodiment, it should be appreciated that in alternative embodiments, the control system 26 may include the base station controller 68. For example, in certain embodiments, control functions of the control system 26 may be distributed between the off-road vehicle controller 46 and the base station controller 68. In further embodiments, the base station controller 68 may perform a substantial portion of the control functions of the control system 26. For example, in certain embodiments, the transceiver 28 may output signals indicative of the magnitude of slippage and/or the rate of change of slippage to the transceiver 30. In such embodiments, the transceiver 30 may output corresponding signals to the base station controller 68, and the base station controller 68 may determine the appropriate action based on the magnitude of slippage and/or the rate of change of slippage and output a signal indicative of the appropriate action. For example, the controller 68 may output a signal to the user interface, instructing the user interface to alert the operator of the slippage (e.g., if a medium or high degree of slippage is detected). In addition, the controller 68 may output instructions to the off-road vehicle controller 46 (e.g., via the transceivers 28 and 30), instructing the off-road vehicle and/or the agricultural implement to perform certain operations (e.g., instructions to reduce the penetration depth of at least one ground engaging tool of the agricultural implement, instructions to stop the off-road vehicle, etc.).

Figure 3:
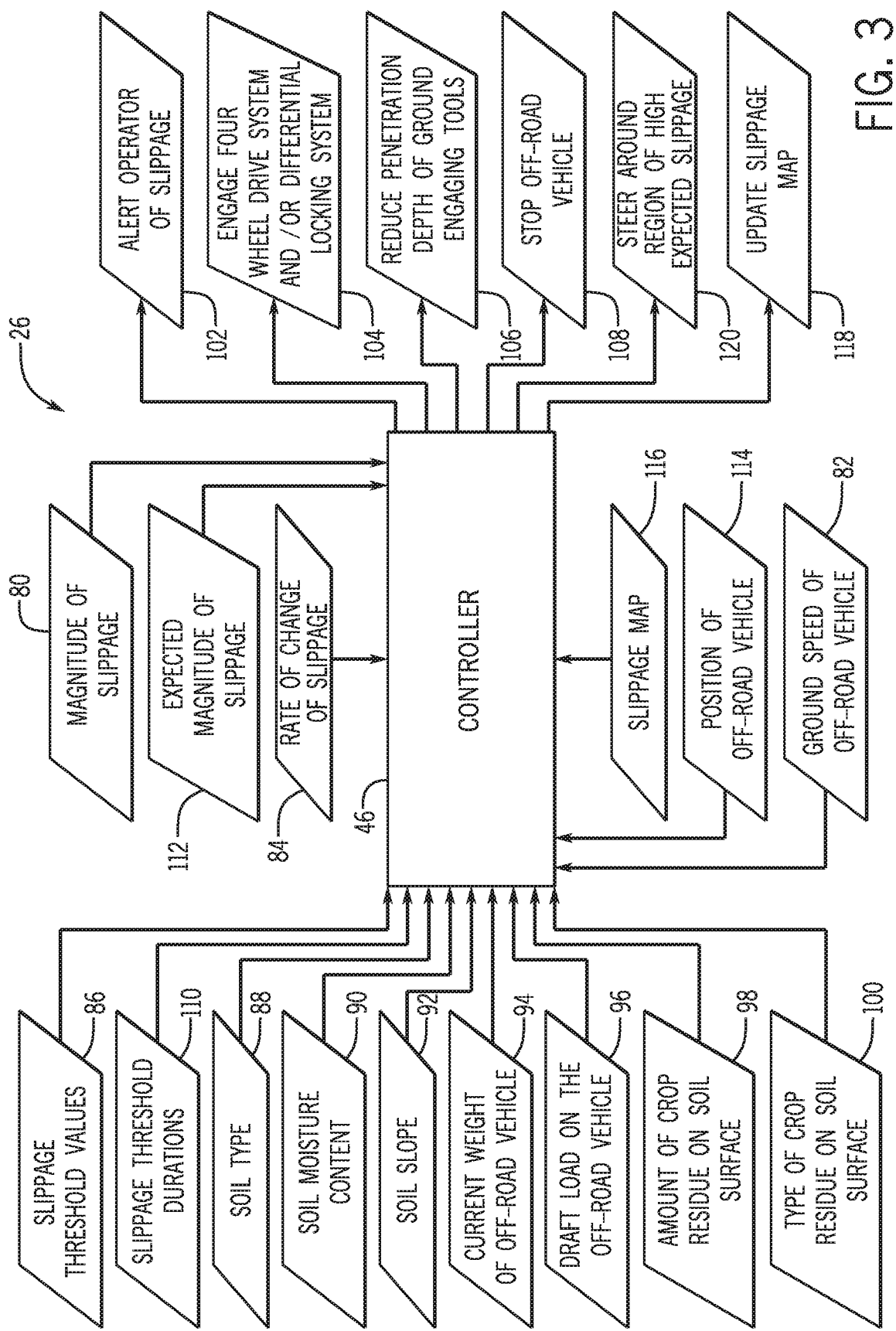
FIG. 3 is a block diagram of an embodiment of a control system that may be employed within the slip control system of FIG. 2.

FIG. 3 is a block diagram of an embodiment of a control system 26 that may be employed within the slip control system of FIG. 2. In the illustrated embodiment, the control system 26 includes the off-road vehicle controller 46. However, as previously discussed, the control system may include the base station controller (e.g., alone or in combination with the off-road vehicle controller). As illustrated, the controller 46 receives a signal 80 indicative of the magnitude of slippage. In certain embodiments, the signal 80 is received from the sensor assembly, which is configured to determine a rotation rate of each wheel/track of the off-road vehicle. In such embodiments, the controller 46 determines a speed of the ground engaging surface of each wheel or track based on the respective rotation rate and a diameter of the respective tire or a length of the respective track, for example. The controller 46 then determines a magnitude of slippage for each wheel or track by determining the percentage difference between the speed of the respective ground engaging surface and the ground speed 82 of the off-road vehicle (e.g., provided by the spatial locating device, by a radar speed sensor, etc.). In certain embodiments, the controller 46 may set the magnitude of slippage of the off-road vehicle to the maximum magnitude of slippage of the wheels and/or tracks.

In the illustrated embodiment, the controller 46 also receives a signal 84 indicative of the rate of change of slippage. In certain embodiments, the signal 84 is received from the sensor assembly, which is configured to determine a rotation rate of each wheel/track of the off-road vehicle. In such embodiments, the controller 46 determines the magnitude of slippage of the off-road vehicle (e.g., as described above). The controller 46 then determines the rate of change of slippage by determining the change in the magnitude of slippage as a function of time (e.g., in terms of percent of slippage per minute).

In the illustrated embodiment, the controller 46 receives a signal 86 indicative of one or more slippage threshold values. For example, the controller 46 may receive the signal 86 indicative of the one or more slippage threshold values from a user interface, such as the base station user interface. By way of example, the one or more slippage threshold values may be manually input into the base station user interface and then transmitted to the off-road vehicle controller 46 via the transceivers. In further embodiments, the controller 46 may determine certain slippage threshold values based on certain operating parameters (e.g., in addition to receiving certain slippage threshold values from the user interface, or as an alternative to receiving the slippage threshold values from the user interface). In such embodiments, the controller 46 receives a signal 88 indicative of soil type (e.g., soil composition, soil density, etc.), a signal 90 indicative of soil moisture content, a signal 92 indicative of soil slope, a signal 94 indicative of a current weight of the off-road vehicle, a signal 96 indicative of a draft load on the off-road vehicle, a signal 98 indicative of an amount of crop residue on the soil surface, a signal 100 indicative of a type of crop residue on the soil surface, or a combination thereof.

Signals related to certain operating parameters may be received from the base station controller (e.g., via the base station transceiver and the off-road vehicle transceiver). For example, the base station storage device may contain data related to soil type, soil moisture content, soil slope, amount of crop residue on the soil surface, and type of crop residue on the soil surface (e.g., in the form of one or more maps). The base station controller may instruct the base station transceiver to output the soil and residue data to the off-road vehicle controller 46 via the off-road vehicle transceiver. Accordingly, the off-road vehicle controller 46 may receive the signal 88 indicative of soil type, the signal 90 indicative of soil moisture content, the signal 92 indicative of soil slope, the signal 98 indicative of the amount of crop residue on the soil surface, the signal 100 indicative of the type of crop residue on the soil surface, or a combination thereof, from the base station controller.

In certain embodiments, the off-road vehicle includes sensors (e.g., load cells, strain gauges, etc.) configured to output the signal 94 indicative of the current weight of the off-road vehicle. For example, a sensor may be located at each wheel or track and configured to output a signal indicative of the load applied by the off-road vehicle to the respective wheel or track. The controller 46 may add the individual loads to one another to determine the current weight of the off-road vehicle. Furthermore, the off-road vehicle may include a sensor (e.g., load cell, strain gauge, etc.) coupled to the hitch assembly of the off-road vehicle and configured to output the signal 96 indicative of the draft load on the off-road vehicle. Once the signals have been received, the off-road vehicle controller 46 may then determine one or more threshold values based at least in part on the soil type, the soil moisture content, the soil slope, the current weight of the off-road vehicle, the draft load on the off-road vehicle, the amount of crop residue on the soil surface, the type of crop residue on the soil surface, or a combination thereof.

In certain embodiments, the controller 46 outputs a signal indicative of a first action if the magnitude of slippage is greater than a first threshold value and less than or equal to a second threshold value, in which the second threshold value is greater than the first threshold value. In certain embodiments, the first and second threshold values establish a slippage range that corresponds to a medium degree of slippage. Additionally or alternatively, the controller 46 outputs the signal indicative of the first action if the rate of change of slippage is greater than a third threshold value and less than or equal to a fourth threshold value, in which the fourth threshold value is greater than the third threshold value. However, in embodiments in which the magnitude of slippage and the rate of change of slippage are compared to the respective threshold values, the controller 46 does not output the signal indicative of the first action if the magnitude of slippage is greater than the second threshold value or the rate of change of slippage is greater than the fourth threshold value.

In certain embodiments, the first action includes alerting an operator that the magnitude of slippage is greater than the first threshold value and/or that the rate of change of slippage is greater than the third threshold value. In such embodiments, the controller 46 outputs a signal 102 (e.g., to the base station user interface) indicative of instructions to alert the operator. Additionally or alternatively, the first action includes engaging a four wheel drive system and/or engaging a differential locking system. Accordingly, the controller 46 outputs a signal 104 (e.g., to the four wheel drive control system and/or to the differential locking control system) indicative of instructions to engage the four wheel drive system and/or the differential locking system. As previously discussed, engaging the four wheel drive system and/or the differential locking system may increase the traction of the off-road vehicle, thereby reducing slippage and/or the possibility of the off-road vehicle becoming stuck in the soil.

In certain embodiments, the controller 46 may output a signal indicative of termination of the first action if the magnitude of slippage decreases/is below the first threshold value or increases above the second threshold value, and/or the rate of change of slippage decreases/is below the third threshold value or increases above the fourth threshold value. In further embodiments, the controller 46 may output the signal indicative of termination of the first action if the magnitude of slippage decreases/is below the first threshold value for a threshold duration and the rate of change of slippage decreases/is below the third threshold value for a threshold duration. For example, the controller 46 may output a signal (e.g., to the base station user interface) indicative of instructions to cancel the operator alert and/or instructions to provide an indication that the magnitude of slippage and/or the rate of change of slippage are below the respective threshold values (e.g., that the degree of slippage is low). In addition, the controller may output a signal (e.g., to the four wheel drive control system and/or to the differential locking control system) indicative of instructions to disengage the four wheel drive system and/or the differential locking system. Accordingly, in certain embodiments, the controller may instruct the first action while (e.g., only while, substantially only while, etc.) the magnitude of slippage is greater than the first threshold value and less than or equal to the second threshold value and/or the rate of change of slippage is greater than the third threshold value and less than or equal to the fourth threshold value, and in embodiments in which the magnitude of slippage and the rate of change of slippage are compared to the threshold values, the magnitude of slippage is not greater than the second threshold value and the rate of change of slippage is not greater than the fourth threshold value.

Furthermore, the controller 46 outputs a signal indicative of a second action, different than the first action, if the magnitude of slippage is greater than the second threshold value. Additionally or alternatively, the controller 46 outputs the signal indicative of the second action if the rate of change of slippage is greater than the fourth threshold value. In certain embodiments, the second action includes reducing a penetration depth of at least one ground engaging tool. In such embodiments, the controller 46 outputs a signal 106 (e.g., to the implement control system) indicative of instructions to reduce the penetration depth of one or more ground engaging tools of the agricultural implement. By way of example, the signal 106 may include instructions to reduce the penetration depth of each tillage point on a tilling implement or to disengage each opener disc/blade of a seeding/planting implement from the soil. Reducing the penetration depth of at least one ground engaging tool of the agricultural implement may reduce the draft load on the off-road vehicle, thereby reducing slippage of the off-road vehicle relative to the soil surface.

In certain embodiments, the penetration depth of the ground engaging tool(s) may be particularly adjusted to establish a desired magnitude of slippage. For example, the controller 46 may output a signal (e.g., the signal 106) indicative of instructions to adjust the penetration depth of the ground engaging tool(s) to establish a magnitude of slippage that is within a desired range. If the magnitude of slippage increases above the desired range, the controller 46 may output a signal indicative of instructions to reduce the penetration depth of the ground engaging tool(s), and if the magnitude of slippage decreases below the desired range, the controller 46 may output a signal indicative of instructions to increase the penetration depth of the ground engaging tool(s). In this manner, the desired magnitude of slippage may be substantially maintained.

In certain embodiments, the second action includes stopping the off-road vehicle. In such embodiments, the controller 46 outputs a signal 108 (e.g., to the speed control system) indicative of instructions to stop the off-road vehicle. Stopping the off-road vehicle while the off-road vehicle is experiencing a high degree of slippage (e.g., a magnitude of slippage greater than the second threshold value) may substantially reduce the possibility of the off-road vehicle becoming stuck in the soil.

In certain embodiments, the controller 46 may output a signal indicative of termination of the second action if the magnitude of slippage decreases/is below the second threshold value and/or the rate of change of slippage decreases/is below the fourth threshold value. In further embodiments, the controller 46 may output the signal indicative of termination of the second action if the magnitude of slippage decreases/is below the second threshold value for a threshold duration and/or the rate of change of slippage decreases/is below the fourth threshold value for a threshold duration. For example, the controller 46 may output a signal (e.g., to the implement control system) indicative of instructions to increase the penetration depth of the one or more ground engaging tools of the implement (e.g., to the pre-slippage penetration depth). Accordingly, in certain embodiments, the controller may instruct the second action while (e.g., only while, substantially only while, etc.) the magnitude of slippage is greater than the second threshold value and/or the rate of change of slippage is greater than the fourth threshold value.

In certain embodiments, the controller 46 receives a signal 110 indicative of one or more slippage threshold durations. For example, the controller 46 may receive the signal 110 indicative of the one or more slippage threshold durations from a user interface, such as the base station user interface. By way of example, the one or more slippage threshold durations may be manually input into the base station user interface and then transmitted to the off-road vehicle controller 46 via the transceivers. In certain embodiments, the controller 46 receives the signal 80 indicative of the magnitude of slippage of the off-road vehicle relative to the soil surface. The controller 46 may also receive the signal 86 indicative of one or more slippage threshold values and/or determine certain threshold values based at least in part on the soil type, the soil moisture content, the soil slope, the current weight of the off-road vehicle, the draft load on the off-road vehicle, the amount of crop residue on the soil surface, the type of crop residue on the soil surface, or a combination thereof.

If the magnitude of slippage is greater than a first threshold value and less than or equal to a second threshold value for more than a first threshold duration, the controller 46 outputs a signal indicative of the first action. As previously discussed, the first action may include alerting an operator of the slippage via the signal 102, and/or engaging a four wheel drive system and/or a differential locking system via the signal 104. In certain embodiments, the controller 46 may output a signal indicative of termination of the first action (e.g., canceling the alert, disengaging the four wheel drive system and/or the differential locking system, etc.) if the magnitude of slippage decreases below the first threshold value. In further embodiments, the controller 46 may output the signal indicative of termination of the first action if the magnitude of slippage decreases below the first threshold value for a threshold duration. Accordingly, in certain embodiments, the controller may instruct the first action while (e.g., only while, substantially only while, etc.) the magnitude of slippage is greater than the first threshold value and less than or equal to the second threshold value for more than the first threshold duration.

Furthermore, the controller 46 outputs a signal indicative of the second action if the magnitude of slippage is greater than the second threshold value. As previously discussed, the second action may include reducing a penetration depth of at least one ground engaging tool via the signal 106 and/or stopping the off-road vehicle via the signal 108. In certain embodiments, the controller 46 may output a signal indicative of termination of the second action (e.g., increasing the penetration depth of the at least one ground engaging tool, etc.) if the magnitude of slippage decreases below the second threshold value or if the magnitude of slippage decreases below the second threshold value for a threshold duration. Accordingly, in certain embodiments, the controller may instruct the second action while (e.g., only while, substantially only while, etc.) the magnitude of slippage is greater than the second threshold value.

In certain embodiments, the controller 46 is configured to receive the signal 84 indicative of the rate of change of slippage. In such embodiments, the controller 46 outputs the signal indicative of the first action if the rate of change of slippage is greater than a third threshold value and less than or equal to a fourth threshold value, and not if the magnitude of slippage is greater than the second threshold value. Additionally or alternatively, the controller 46 outputs the signal indicative of the second action if the rate of change of slippage is greater than the fourth threshold value. Furthermore, the controller 46 does not output the signal indicative of the first action if the rate of change of slippage is greater than a fourth threshold value. In further embodiments, the controller 46 is configured to output the signal indicative of the second action and to not output the signal indicative of the first action if the magnitude of slippage is greater than a fifth threshold value for more than a second threshold duration, in which the fifth threshold value is greater than or equal to the first threshold value and less than the second threshold value.

In certain embodiments, the controller 46 receives a signal 112 indicative of an expected magnitude of slippage. For example, the expected magnitude of slippage for each position within the field may be stored in the storage device of the base station. The base station controller, which is communicatively coupled to the storage device, may output the expected magnitude to the off-road vehicle controller 46 (e.g., via the transceivers). By way of example, the off-road vehicle controller 46 may receive a signal 114 indicative of the position of the off-road vehicle within the field (e.g., from the spatial locating device). The off-road vehicle controller 46 may then output the position of the off-road vehicle to the base station controller via the transceivers. The base station controller may determine the expected magnitude of slippage at the position of the off-road vehicle (e.g., using data stored within the storage device). The base station controller may then output the expected magnitude of slippage to the off-road vehicle controller 46 via the transceivers.

In further embodiments, the controller 46 determines the expected magnitude of slippage based at least in part on a slippage map. In such embodiments, the controller 46 receives a signal 116 indicative of the slippage map (e.g., from the base station controller via the transceivers) and/or accesses a slippage map stored within the off-road vehicle controller memory. The slippage map may include weather data (e.g., rainfall data, air temperature data, air humidity data, wind speed data, solar intensity data, etc.), soil moisture data, topographical data, or a combination thereof, among other data related to slippage. In addition, the slippage map may include slippage data from one or more previous passes through the field and/or along one or more previously traversed rows. The slippage map includes data having values that vary based on position within the field. Accordingly, as the off-road vehicle moves along the selected/planned route, the controller 46 accesses data associated with the current position (e.g., based on the signal 114 indicative of the position of the off-road vehicle within the field). The controller then determines the expected magnitude of slippage at the current position and/or within an upcoming region (e.g., a region within the selected/planned route of the off-road vehicle).

In certain embodiments, the controller 46 receives the signal 80 indicative of the magnitude of slippage of the off-road vehicle relative to the soil surface (e.g., a determined magnitude of slippage). The controller 46 may also receive the signal 86 indicative of one or more slippage threshold values and/or determine certain threshold values based at least in part on the soil type, the soil moisture content, the soil slope, the current weight of the off-road vehicle, the draft load on the off-road vehicle, the amount of crop residue on the soil surface, the type of crop residue on the soil surface, or a combination thereof. If the determined magnitude of slippage is greater than a first threshold value and less than or equal to a second threshold value, the controller 46 outputs a signal indicative of the first action. Additionally or alternatively, if the expected magnitude of slippage is greater than the first threshold value and less than or equal to the second threshold value, the controller 46 outputs a signal indicative of the first action. However, in embodiments in which the determined magnitude of slippage and the expected magnitude of slippage are compared to the threshold values, the controller 46 does not output the signal indicative of the first action if the determined magnitude of slippage or the expected magnitude of slippage is greater than the second threshold value. As previously discussed, the first action may include alerting an operator of the slippage via the signal 102, and/or engaging a four wheel drive system and/or a differential locking system via the signal 104.

In certain embodiments, the controller 46 may output a signal indicative of termination of the first action (e.g., canceling the alert, disengaging the four wheel drive system and/or the differential locking system, etc.) if the determined magnitude of slippage decreases below the first threshold value or increases above the second threshold value, and/or the expected magnitude of slippage decreases below the first threshold value or increases above the second threshold value. In further embodiments, the controller 46 may output a signal indicative of termination of the first action if the determined magnitude of slippage decreases below the first threshold value for a threshold duration and/or the expected magnitude of slippage decreases below the first threshold value for a threshold duration. Accordingly, in certain embodiments, the controller may instruct the first action while (e.g., only while, substantially only while, etc.) the determined magnitude of slippage is greater than the first threshold value and less than or equal to the second threshold value and/or the expected magnitude of slippage is greater than the first threshold value and less than or equal to the second threshold value, and in embodiments in which the determined magnitude of slippage and the expected magnitude of slippage are compared to the threshold values, the determined magnitude of slippage and the expected magnitude of slippage are not greater than the second threshold value.

Furthermore, the controller 46 outputs a signal indicative of the second action if the determined magnitude of slippage is greater than the second threshold value. Additionally or alternatively, the controller 46 outputs a signal indicative of the second action if the expected magnitude of slippage is greater than the second threshold value. As previously discussed, the second action may include reducing a penetration depth of at least one ground engaging tool via the signal 106 and/or stopping the off-road vehicle via the signal 108. In certain embodiments, the controller 46 may output a signal indicative of termination of the second action (e.g., increasing the penetration depth of the at least one ground engaging tool, etc.) if the determined magnitude of slippage decreases below the second threshold value and/or the expected magnitude of slippage decreases below the second threshold value. In further embodiments, the controller 46 may output the signal indicative of termination of the second action if the determined magnitude of slippage decreases below the second threshold value for a threshold duration and/or the expected magnitude of slippage decreases below the second threshold value for a threshold duration. Accordingly, in certain embodiments, the controller may instruct the second action while (e.g., only while, substantially only while, etc.) the determined magnitude of slippage is greater than the second threshold value and/or the expected magnitude of slippage is greater than the second threshold value.

In certain embodiments, the controller 46 updates the slippage map (e.g., by outputting a signal 118 indicative of the update and/or by updating the slippage map within the off-road vehicle controller memory) based at least in part on the determined magnitude of slippage (e.g., the magnitude of slippage determined by the controller 46 based on input from the sensor assembly). By way of example, each point of the slippage map (e.g., corresponding to a position within the field) may be updated if the difference between the determined slippage and the expected slippage at that point is greater than a threshold value. As a result, the accuracy of the slippage map may be enhanced, thereby increasing the efficiency of subsequent agricultural operations. In certain embodiments, the controller 46 outputs a signal 120 indicative of instructions to steer around an upcoming region (e.g., a region within the selected/planned route of the off-road vehicle) if the expected magnitude of slippage within the upcoming region is greater than the second threshold value. Steering around a region in which the off-road vehicle may experience a high degree of slippage may substantially reduce the possibility of the off-road vehicle becoming stuck in the soil, thereby enhancing the efficiency of agricultural operations.

In certain embodiments, the controller 46 may output a signal indicative of instructions to return to the bypassed region (e.g., the region having a high degree of expected slippage) after the remainder of the selected/planned route is complete. Once the off-road vehicle reaches the bypassed region, the controller 46 may output a signal indicative of instructions to alert an operator (e.g., via the base station user interface) that a high degree of slippage is expected. While the off-road vehicle is traversing the region, the operation of the off-road vehicle may be monitored and/or controlled by the operator (e.g., in addition to the control system) to reduce the possibility of the off-road vehicle becoming stuck in the soil. By performing agricultural operations (e.g., tilling, planting, harvesting, etc.) on the high expected slippage region, the total productivity of the field may be increased.

Figure 4:
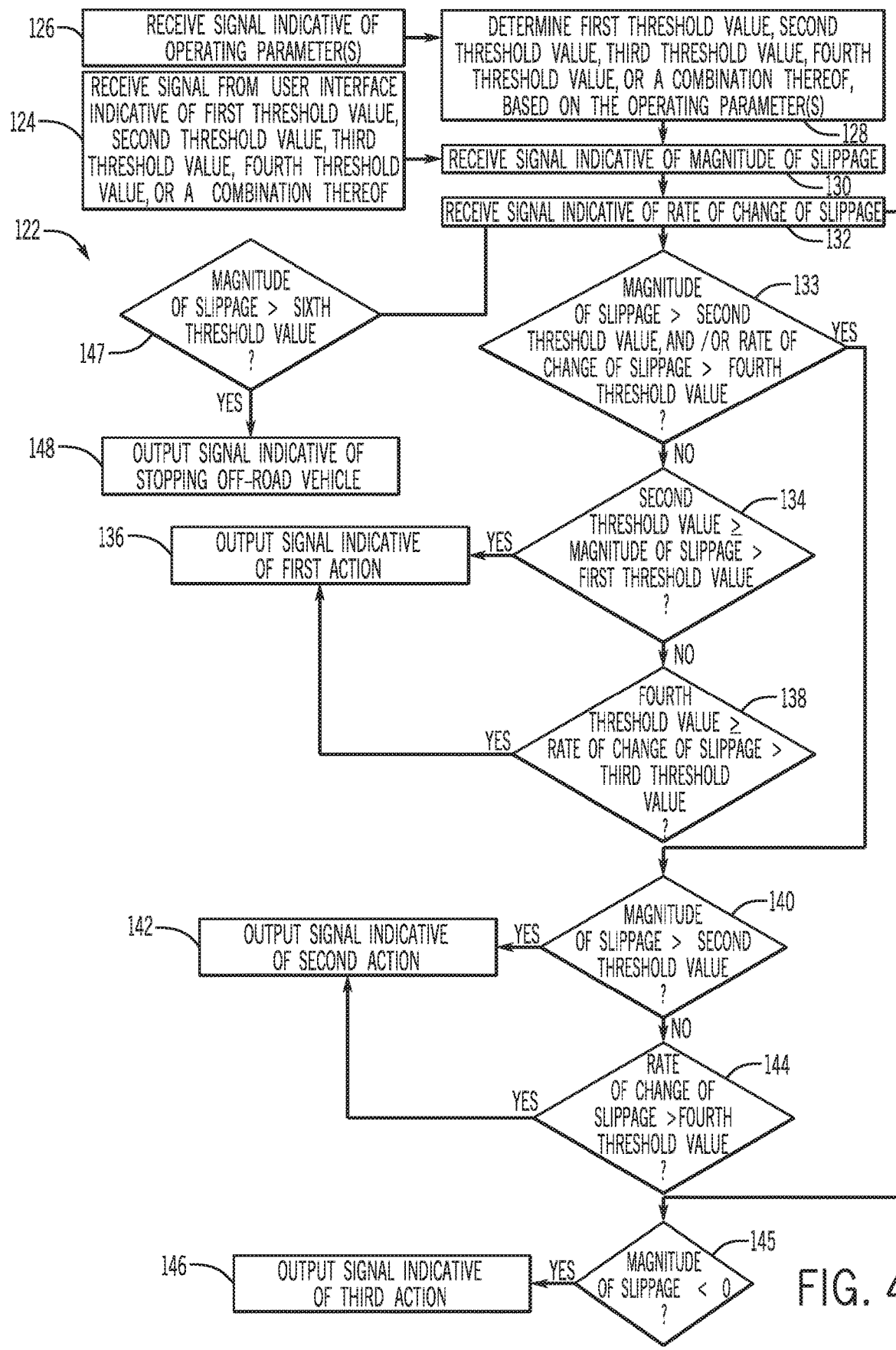
FIG. 4 is a flow diagram of an embodiment of a method for controlling slippage of an off-road vehicle.

FIG. 4 is a flow diagram of an embodiment of a method 122 for controlling slippage of an off-road vehicle. First, as represented by block 124, a signal indicative of a first threshold value, a second threshold value, a third threshold value, a fourth threshold value, or a combination thereof, is received from a user interface (e.g., the base station user interface). Additionally or alternatively, a signal indicative of operating parameter(s) is received, as represented by block 126. As previously discussed, the operating parameters may include soil type, soil moisture content, soil slope, a current weight of the off-road vehicle, a draft load on the off-road vehicle, an amount of crop residue on the soil surface, and a type of crop residue on the soil surface, among other parameters. The first threshold value, the second threshold value, the third threshold value, the fourth threshold value, or a combination thereof, is then determined based on the operating parameter(s), as represented by block 128.

Next, as represented by block 130, a signal indicative of a magnitude of slippage of the off-road vehicle relative to the soil surface is received (e.g., from the sensor assembly). Additionally or alternatively, a signal indicative of a rate of change of slippage of the off-road vehicle relative to the soil surface is received (e.g., from the sensory assembly), as represented by block 132. As represented by block 133, if the magnitude of slippage is greater than the second threshold value and/or the rate of change of slippage is greater than the fourth threshold value, the method 122 proceeds to block 140. Otherwise, the method 122 proceeds to block 134. If the magnitude of slippage is greater than the first threshold value and less than or equal to the second threshold value, as represented by block 134, a signal indicative of a first action is output, as represented by block 136. In addition, if the rate of change of slippage is greater than the third threshold value and less than or equal to the fourth threshold value, as represented by block 138, the signal indicative of the first action is output, as represented by block 136. As previously discussed, the first action may include alerting an operator that the magnitude of slippage is greater than the first threshold value and/or that the rate of change of slippage is greater than the third threshold value. Additionally or alternatively, the first action may include engaging a four wheel drive system and/or engaging a differential locking system.

Furthermore, if the magnitude of slippage is greater than the second threshold value, as represented by block 140, a signal indicative of a second action, different than the first action, is output, as represented by block 142. In addition, if the rate of change of slippage is greater than the fourth threshold value, as represented by block 144, the signal indicative of the second action is output, as represented by block 142. As previously discussed, the second action may include reducing a penetration depth of at least one ground engaging tool (e.g., a ground engaging tool of the agricultural implement). Additionally or alternatively, the second action may include stopping the off-road vehicle (e.g., via the speed control system).

If the magnitude of slippage is less than zero (i.e., the magnitude of slippage is negative), as represented by block 145, a signal indicative of a third action is output, as represented by block 146. As previously discussed, a negative magnitude of slippage may be indicative of the off-road vehicle sliding relative to the soil surface. In certain embodiments, the third action may include increasing the rotational speed of one or more wheels and/or tracks (e.g., via the engine output control system and/or the transmission control system) to dislodge soil from recesses between treads, adjusting (e.g., increasing or decreasing) the braking force applied to one or more wheels and/or tracks (e.g., via the braking control system), disengaging the transmission (e.g., via the transmission control system), or a combination thereof. In further embodiments, if the off-road vehicle is on a slope, the third action may include turning the off-road vehicle in a downhill direction (e.g., such that the wheels and/or tracks are aligned with the slope). In certain embodiments, a signal indicative of termination of the first action and/or the section action may also be output if the magnitude of slippage is less than zero. In further embodiments, a signal indicative of termination of the third action may be output if the rate of change of slippage is greater than the fourth threshold value.

In certain embodiments, if the magnitude of slippage is greater than a sixth threshold value, as represented by block 147, a signal indicative of stopping the off-road vehicle is output, as represented by block 148. By way of example, the sixth threshold value may be about 90 percent slippage (e.g., indicative of a very high degree of slippage). Stopping the off-road vehicle while the off-road vehicle is experiencing a very high degree of slippage may substantially reduce or eliminate the possibility of the off-road vehicle becoming stuck in the soil. In certain embodiments, a signal indicative of termination of the first action and/or the section action may also be output if the magnitude of slippage is greater than the sixth threshold value.

Figure 5:
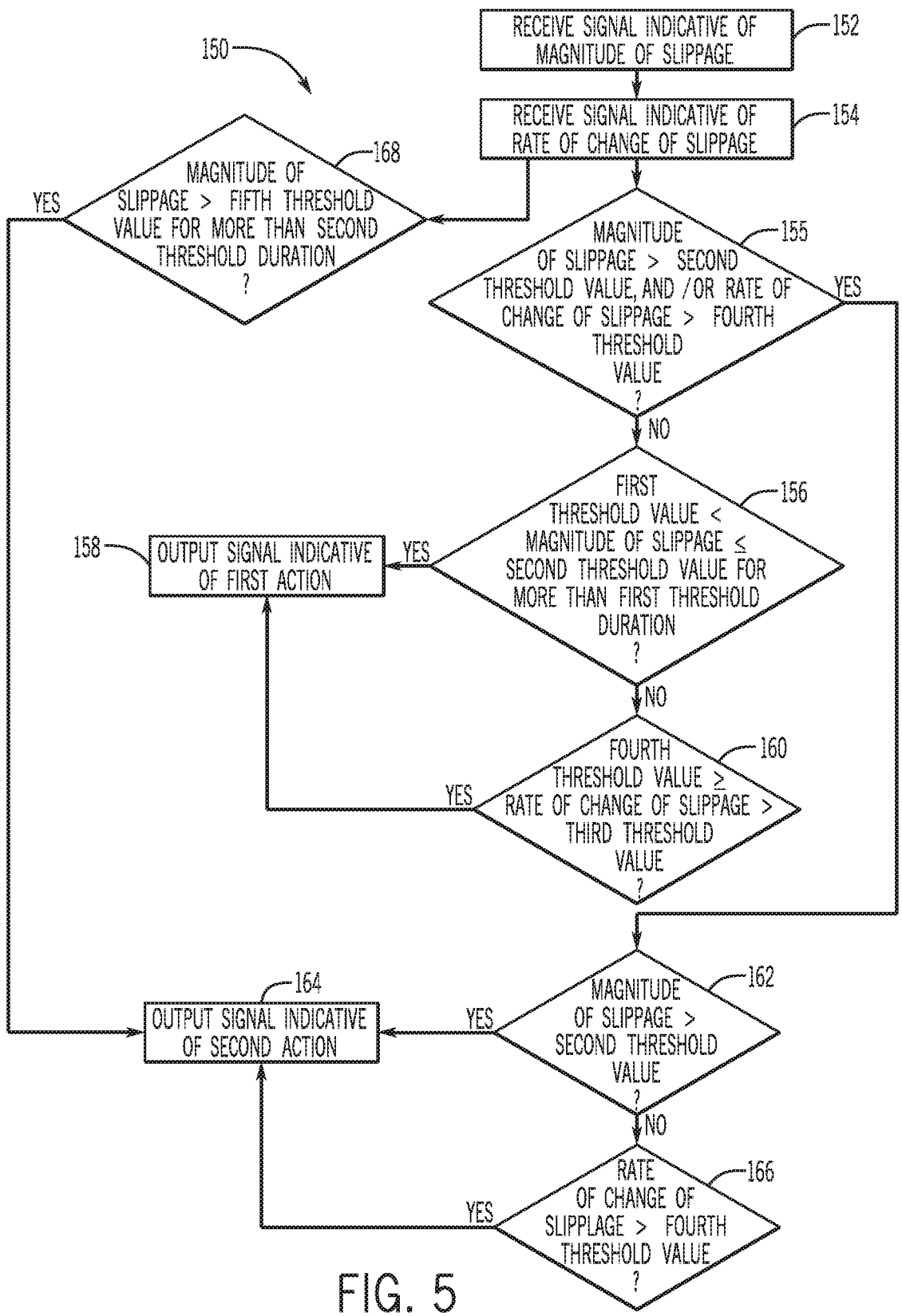
FIG. 5 is a flow diagram of another embodiment of a method for controlling slippage of an off-road vehicle.

FIG. 5 is a flow diagram of another embodiment of a method 150 for controlling slippage of an off-road vehicle. First, as represented by block 152, a signal indicative of a magnitude of slippage of the off-road vehicle relative to the soil surface is received (e.g., from the sensor assembly). Additionally or alternatively, a signal indicative of a rate of change of slippage of the off-road vehicle relative to the soil surface is received, as represented by block 154. As represented by block 155, if the magnitude of slippage is greater than the second threshold value and/or the rate of change of slippage is greater than the fourth threshold value, the method proceeds to block 162. Otherwise, the method 150 proceeds to block 156. If the magnitude of slippage is greater than a first threshold value and less than or equal to a second threshold value for more than a first threshold duration, as represented by block 156, a signal indicative of a first action is output, as represented by block 158. In addition, if the rate of change of slippage is greater than a third threshold value and less than or equal to a fourth threshold value, as represented by block 160, the signal indicative of the first action is output, as represented by block 158. As previously discussed, the first action may include alerting an operator that the magnitude of slippage is greater than the first threshold value and/or that the rate of change of slippage is greater than the third threshold value. Additionally or alternatively, the first action may include engaging a four wheel drive system and/or engaging a differential locking system.

Furthermore, if the magnitude of slippage is greater than the second threshold value, as represented by block 162, a signal indicative of a second action, different than the first action, is output, as represented by block 164. In addition, if the rate of change of slippage is greater than the fourth threshold value, as represented by block 166, the signal indicative of the second action is output, as represented by block 164. As previously discussed, the second action may include reducing a penetration depth of at least one ground engaging tool (e.g., a ground engaging tool of the agricultural implement). Additionally or alternatively, the second action may include stopping the off-road vehicle (e.g., via the speed control system).

Furthermore, if the magnitude of slippage is greater than a fifth threshold value for more than a second threshold duration, as represented by block 168, the signal indicative of the second action is output, as represented by block 164. In addition, if the magnitude of slippage is greater than the fifth threshold value for more than the second threshold duration, the signal indicative of the first action is not output and/or a signal indicative of termination of the first action is output. In certain embodiments, the fifth threshold value is greater than or equal to the first threshold value and less than the second threshold value.

Figure 6:
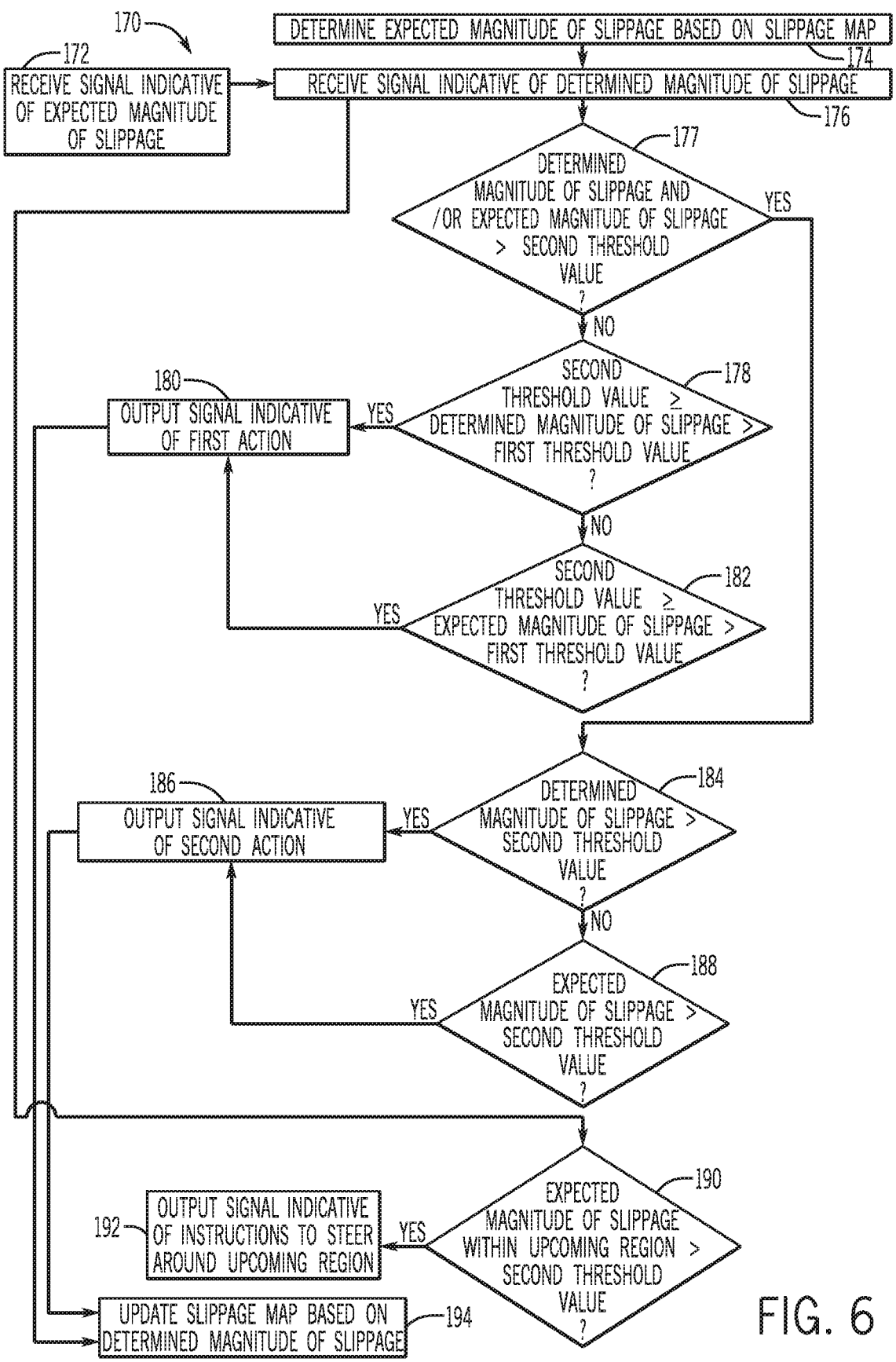
FIG. 6 is a flow diagram of a further embodiment of a method for controlling slippage of an off-road vehicle.

FIG. 6 is a flow diagram of a further embodiment of a method 170 for controlling slippage of an off-road vehicle. First, as represented by block 172, a signal indicative of an expected magnitude of slippage of the off-road vehicle relative to the soil surface is received. Additionally or alternatively, the expected magnitude of slippage is determined based at least in part on a slippage map, as represented by block 174. As previously discussed, the slippage map may include weather data (e.g., rainfall data, air temperature data, air humidity data, wind speed data, solar intensity data, etc.), soil moisture data, topographical data, or a combination thereof. In addition, the slippage map may include slippage data from one or more previous passes through the field and/or from one or more previously traversed rows. Next, as represented by block 176, a signal indicative of a determined magnitude of slippage of the off-road vehicle relative to the soil surface is received (e.g., from the sensor assembly).

As represented by block 177, if the determined magnitude of slippage and/or the expected magnitude of slippage is not greater than a second threshold value, the method 170 proceeds to block 178. If the determined magnitude of slippage is greater than a first threshold value and less than or equal to the second threshold value, as represented by block 178, a signal indicative of a first action is output, as represented by block 180. Additionally or alternatively, if the expected magnitude of slippage is greater than the first threshold value and less than or equal to the second threshold value, as represented by block 182, the signal indicative of the first action is output, as represented by block 180. As previously discussed, the first action may include alerting an operator that the determined magnitude of slippage and/or the expected magnitude of slippage is greater than the first threshold value. Additionally or alternatively, the first action may include engaging a four wheel drive system and/or engaging a differential locking system.

Furthermore, if the determined magnitude of slippage and/or the expected magnitude of slippage is greater than the second threshold value, the method 170 proceeds to block 184. If the determined magnitude of slippage is greater than the second threshold value, as represented by block 184, a signal indicative of a second action, different than the first action, is output, as represented by block 186. Additionally or alternatively, if the expected magnitude of slippage is greater than the second threshold value, as represented by block 188, the signal indicative of the second action is output, as represented by block 186. As previously discussed, the second action may include reducing a penetration depth of at least one ground engaging tool (e.g., a ground engaging tool of the agricultural implement). Additionally or alternatively, the second action may include stopping the off-road vehicle (e.g., via the speed control system).

If the expected magnitude of slippage within an upcoming region is greater than the second threshold value, as represented by block 190, a signal indicative of instructions to steer around the upcoming region is output (e.g., to the steering control system), as represented by block 192. As previously discussed, steering around a region in which the off-road vehicle may experience a high degree of slippage may substantially reduce the possibility of the off-road vehicle becoming stuck in the soil, thereby enhancing the efficiency of agricultural operations. Furthermore, as represented by block 194, the slippage map is updated (e.g., after the step associated with block 180, or after the step associated with block 186) based at least in part on the determined magnitude of slippage (e.g., the magnitude of slippage determined by the off-road vehicle controller based on input from the sensor assembly). By way of example, each point of the slippage map (e.g., corresponding to a position within the field) may be updated if the difference between the determined slippage and the expected slippage at that point is greater than a threshold value. As a result, the accuracy of the slippage map may be enhanced, thereby increasing the efficiency of subsequent agricultural operations.

In certain embodiments, steps of one method may be integrated into another method (e.g., in any suitable manner). For example, in the method 122 described above with reference to FIG. 4, a signal indicative of the threshold values is receive and/or the threshold values are determined, as represented by blocks 124, 126, and 128. It should be appreciated that one or more of the steps associated with blocks 124, 126, and 128 may be integrated into the method 150 described above with reference to FIG. 5 and/or the method 170 described above with reference to FIG. 6. Furthermore, in the method 170 described above with reference to FIG. 6, the expected magnitude is compared to the first and second threshold values to determine whether to perform the first action and/or the second action, as represented by blocks 182 and 188. It should be appreciated that one or more of the steps associated with blocks 182 and 188 may be integrated into the method 122 described above with reference to FIG. 4 and/or the method 150 described above with reference to FIG. 5.

Furthermore, while each method described above with reference to FIGS. 4-6 includes steps for outputting a signal indicative of a first action and outputting a signal indicative of a second action, it should be appreciated that in certain embodiments, one or more of the methods may omit one of the steps for outputting a signal indicative of one action. For example, in certain embodiments, the method 122 described above with reference to FIG. 4 may omit the steps 134, 136, and 138 for outputting a signal indicative of the first action, or the method 122 may omit the steps 140, 142, and 144 for outputting a signal indicative of the second action. In further embodiments, the method 150 described above with reference to FIG. 5 may omit the steps 156, 158, and 160 for outputting a signal indicative of the first action, or the method 150 may omit the steps 162, 164, 166, and 168 for outputting a signal indicative of the second action. Furthermore, in certain embodiments, the method 170 described above with reference to FIG. 6 may omit the steps 178, 180, and 182 for outputting a signal indicative of the first action, or the method 170 may omit the steps 184, 186, and 188 for outputting a signal indicative of the second action.

While the operations associated with the second action described above include reducing a penetration depth of at least one ground engaging tool and stopping the off-road vehicle, it should be appreciated that in certain embodiments, the control system may be configured to output instructions indicative of other operations. For example, the control system may output a signal (e.g., to the base station user interface) indicative of instructions to alert the operator that the magnitude of slippage is greater than the second threshold value, the rate or slippage is greater than the fourth threshold value, the expected magnitude of slippage is greater than the second threshold value, or a combination thereof. In addition, the off-road vehicle may enter a region in which a medium degree of slippage is expected. However, the determined magnitude of slippage may be significantly higher than the expected magnitude of slippage. If a high degree of slippage is detected proximate to the entrance of the region, the control system may instruct the steering control system to direct the off-road vehicle toward the closest boundary of the region or along a lower slippage path toward a boundary of the region (e.g., a path through a portion of the region having a lower expected slippage than the expected slippage along the selected/planned route through the region). Accordingly, the second action may include steering out of the region. However, if a high degree of slippage is detected proximate to the exit of the region (e.g., the boundary of the region along the selected/planned route), the control system may instruct the off-road vehicle to continue to the exit without taking action. For example, during harvesting operations, any compaction or wheel ruts caused by continuing to the exit without taking action may be mitigated during subsequent tilling operations. However, during seeding operations and/or if "no till" operations are desired, the control system may output instructions indicative of other operations (e.g., reducing the penetration depth of at least one ground engaging tool, stopping the off-road vehicle, etc.) to reduce the possibility of compaction or rutting.

In certain embodiments, the operation(s) associated with the first action and/or the operation(s) associated with the second action may be selected based on user input. For example, before the off-road vehicle begins the route through the field, an operator may associate one or more operations with the first action (e.g., from a list of operations including alerting the operator of the slippage, engaging the four wheel drive system, engaging the differential locking system, etc.). When the off-road vehicle experiences conditions sufficient to initiate the first action (e.g., the magnitude of slippage is greater than the first threshold value and less than or equal to the second threshold value, etc.), the off-road vehicle controller outputs a signal indicative of the first action, thereby initiating performance of the selected operation(s). In addition, before the off-road vehicle begins the route through the field, the operator may associate one or more operations with the second action (e.g., from a list of operations including alerting the operator of the slippage, reducing the penetration depth of at least one ground engaging tool, stopping the off-road vehicle, etc.). When the off-road vehicle experiences conditions sufficient to initiate the second action (e.g., the magnitude of slippage is greater than the second threshold value, etc.), the off-road vehicle controller outputs a signal indicative of the second action, thereby initiating performance of the selected operation(s).

Furthermore, if multiple operations are associated with the first action and/or the second action, the operator may select whether the operations are performed sequentially (e.g., separated by a time delay) or concurrently. For example, the first action may include concurrently alerting the operator of the slippage and engaging the four wheel drive system. In addition, the first action may include engaging the four wheel drive system and then alerting the operator of the slippage after a threshold duration. By way of example, if the magnitude of slippage is greater than the first threshold value and less than or equal to the second threshold value, the four wheel drive system may be engaged. However, if the magnitude of slippage remains greater than the first threshold value and less than or equal to the second threshold value for more than a threshold duration after the four wheel drive system is engaged, the operator may be alerted, thereby informing the operator that engagement of the four wheel drive system has not reduced the magnitude of slippage below the first threshold value.

Furthermore, the second action may include concurrently alerting the operator of the slippage and reducing the penetration depth of at least one ground engaging tool. In addition, the second action may include reducing the penetration depth of at least one ground engaging tool and then alerting the operator of the slippage after a threshold duration. By way of example, if the magnitude of slippage is greater than the second threshold value, the penetration depth of at least one ground engaging tool may be reduced. However, if the magnitude of slippage remains greater than the second threshold value for more than a threshold duration after the penetration depth of the at least one ground engaging tool is reduced, the operator may be alerted, thereby informing the operator that reducing the penetration depth of the at least one ground engaging tool has not reduced the magnitude of slippage below the second threshold value.

In certain embodiments, the control system may be configured to adjust the selected/planned path of the off-road vehicle based on the soil map. For example, during seeding and/or application operations, the control system may establish a route that applies product (e.g., seeds, fertilizer, etc.) to high expected slippage regions while the level of product within the agricultural implement is low (e.g., after applying product to low and/or medium expected slippage regions). As a result, the weight of the implement is reduced while the off-road vehicle is within the high expected slippage regions, thereby reducing ground pressure exerted by the implement and the off-road vehicle (e.g., by reducing the tongue load applied by the agricultural implement to the off-road vehicle). Accordingly, the magnitude of slippage within the high expected slippage regions may be reduced. In addition, as the off-road vehicle enters a high expected slippage region, the control system may output a signal indicative of instructions to alert an operator (e.g., via the base station user interface) that a high degree of slippage is expected. While the off-road vehicle is traversing the region, the operation of the off-road vehicle may be monitored and/or controlled by the operator (e.g., in addition to the slip control system) to reduce the possibility of the off-road vehicle becoming stuck in the soil.

In further embodiments, the slippage map may be used for subsequent tilling operations. For example, soil under the wheels and/or tracks of the off-road vehicle may become compacted and/or rutted as the off-road vehicle traverses high slippage regions (e.g., regions having soft soil). Because the control system may update the soil map based at least in part on the determined magnitude of slippage, the high slippage regions may be identified on the soil map. Accordingly, an operator or an automated system may direct a tillage tool to the high slippage regions to reduce soil compaction and/or rutting within the regions. By only tilling the high slippage regions, as compared to the entire field, the duration and costs associated with tilling operations may be substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A slip control system for an off-road vehicle, comprising:
at least one controller having a memory and a processor, wherein the at least one controller is configured to:
receive a first signal indicative of a magnitude of slippage of the off-road vehicle relative to a soil surface;
receive a second signal indicative of a rate of change of slippage of the off-road vehicle relative to the soil surface;
perform a first action in response to the magnitude of slippage being greater than a first threshold value and less than or equal to a second threshold value for more than a first threshold duration, wherein the first action comprises alerting an operator;
perform a second action, different than the first action, in response to the magnitude of slippage being greater than the second threshold value, wherein the second action comprises controlling operation of the off-road vehicle, an implement towed by the off-road vehicle, or a combination thereof;
perform the first action in response to the rate of change of slippage being greater than a third threshold value and less than or equal to a fourth threshold value; and
not perform the first action in response to the magnitude of slippage being greater than the second threshold value;
wherein the second threshold value is greater than the first threshold value, and the fourth threshold value is greater than the third threshold value.

2. The slip control system of claim 1, wherein the at least one controller is configured to perform the second action in response to the rate of change of slippage being greater than the fourth threshold value;
wherein the at least one controller is configured to not perform the first action in response to the rate of change of slippage being greater than the fourth threshold value.

3. The slip control system of claim 1, wherein the at least one controller is configured to perform the second action and to not perform the first action in response to the magnitude of slippage being greater than a fifth threshold value for more than a second threshold duration, the fifth threshold value is greater than or equal to the first threshold value, and the fifth threshold value is less than the second threshold value.

4. The slip control system of claim 1, wherein the second action comprises controlling operation of the implement to reduce a penetration depth of at least one ground engaging tool of the implement.

5. The slip control system of claim 1, wherein the second action comprises controlling operation of the off-road vehicle to stop the off-road vehicle.

6. A method for controlling slippage of an off-road vehicle, comprising:
  receiving, via at least one controller, a first signal indicative of a magnitude of slippage of the off-road vehicle relative to a soil surface;
  receiving, via the at least one controller, a second signal indicative of a rate of change of slippage of the off-road vehicle relative to the soil surface;
  performing, via the at least one controller, a first action in response to the magnitude of slippage being greater than a first threshold value and less than or equal to a second threshold value for more than a first threshold duration, wherein the first action comprises alerting an operator;
  performing, via the at least one controller, a second action, different than the first action, in response to the magnitude of slippage being greater than the second threshold value, wherein the second action comprises controlling operation of the off-road vehicle, an implement towed by the off-road vehicle, or a combination thereof;
  performing, via the at least one controller, the first action in response to the rate of change of slippage being greater than a third threshold value and less than or equal to a fourth threshold value; and
  not performing the first action in response to the magnitude of slippage being greater than the second threshold value;
  wherein the second threshold value is greater than the first threshold value, and the fourth threshold value is greater than the third threshold value.

7. The method of claim 6, comprising:
  performing, via the at least one controller, the second action in response to the rate of change of slippage being greater than the fourth threshold value; and
  not performing the first action in response to the rate of change of slippage being greater than the fourth threshold value.

8. The method of claim 6, comprising performing, via the at least one controller, the second action and not performing the first action in response to the magnitude of slippage being greater than a fifth threshold value for more than a second threshold duration;
  wherein the fifth threshold value is greater than or equal to the first threshold value, and the fifth threshold value is less than the second threshold value.

9. The method of claim 6, wherein the second action comprises controlling operation of the off-road vehicle to stop the off-road vehicle.

10. The method of claim 6, wherein the second action comprises controlling operation of the implement to reduce a penetration depth of at least one ground engaging tool of the implement.

11. A slip control system for an off-road vehicle, comprising:
  at least one controller having a memory and a processor, wherein the at least one controller is configured to:
    receive a first signal indicative of a magnitude of slippage of the off-road vehicle relative to a soil surface;
    receive a second signal indicative of a rate of change of slippage of the off-road vehicle relative to the soil surface;
    perform a first action in response to the magnitude of slippage being greater than a first threshold value and less than or equal to a second threshold value for more than a first threshold duration, wherein the first action comprises alerting an operator;
    perform a second action, different than the first action, in response to the magnitude of slippage being greater than the second threshold value, wherein the second action comprises stopping the off-road vehicle;
    perform the first action in response to the rate of change of slippage being greater than a third threshold value and less than or equal to a fourth threshold value; and
    not perform the first action in response to the magnitude of slippage being greater than the second threshold value;
  wherein the second threshold value is greater than the first threshold value, and the fourth threshold value is greater than the third threshold value.

12. The slip control system of claim 11, wherein the at least one controller is configured to perform the second action in response to the rate of change of slippage being greater than the fourth threshold value, or a combination thereof;
  wherein the at least one controller is configured to not perform the first action in response to the rate of change of slippage being greater than the fourth threshold value.

13. The slip control system of claim 11, wherein the at least one controller is configured to perform the second action and to not perform the first action in response to the magnitude of slippage being greater than a fifth threshold value for more than a second threshold duration, the fifth threshold value is greater than or equal to the first threshold value, and the fifth threshold value is less than the second threshold value.

14. The slip control system of claim 11, wherein the first action further comprises engaging a four wheel drive system, engaging a differential locking system, or a combination thereof.

* * * * *